March 20, 1956  V. O'GORMAN ET AL  2,739,249
VELOCITY PICKUP DEVICES
Filed Sept. 20, 1954

*Inventors*
Vincent O'Gorman
Robert R. Perron
By their Attorney
Thomas J. Ryan.

United States Patent Office 2,739,249
Patented Mar. 20, 1956

2,739,249

VELOCITY PICKUP DEVICES

Vincent O'Gorman and Robert R. Perron, Beverly, Mass., assignors to United Shoe Machinery Corporation, Flemington, N. J., a corporation of New Jersey Application September 20, 1954, Serial No. 457,274

4 Claims. (Cl. 310—15)

This invention relates to apparatus for measuring velocity, and more particularly to apparatus for measuring the velocity of a machine part by translating such velocity into terms of an electric voltage.

Data respecting the instantaneous velocity of a part during a cycle of movement are frequently of great importance in engineering studies of mechanisms.

In many cases, the addition of mass to the moving part, for example by attaching thereto the coil of a moving-coil velocimeter, would alter the velocity-time characteristics of the part to be studied. Velocimeters with very light moving parts have been developed, but even these require the addition of a definite mass to the moving part, and commonly these velocimeters have a low amplitude of linear movement within which the velocity of the part can be measured.

Frequently, however, the part to be studied, although having a relatively large amplitude of substantially linear movement, has a ferromagnetic portion projecting into a more or less unobstructed area.

For example, the part to be studied may be a gun bolt having a projecting ferromagnetic operating lever, the recoil characteristics of the bolt being such as to be materially altered by the attachment of any additional mass thereto.

It is therefore an object of the present invention to provide a velocity pickup or translating device adapted to translate the linear movement of such a ferromagnetic element as the aforesaid lever into terms of an electric voltage, without affecting the velocity characteristics of said part.

To this end and in accordance with a feature of the present invention, there is provided a velocity pickup adapted to receive a portion of a moving part in the gap between two elongated pole portions of a magnetic structure and to generate between the terminals of an elongated conductor extending lengthwise of the gap and disposed at least partly in the flux path between said portions a voltage proportional to the velocity of the part moving along said gap. In a preferred embodiment of the invention, the gap is provided between elongated pole portions bridged by a bank of permanent magnets to form an elongated magnetic structure of substantially U-shaped cross section, while the conductor in which the voltage is generated by the movement of a part in the gap comprises a thin sheet of conductive material laid across one of said pole pieces transverse of the flux in said gap and secured at opposite edges to bus bars extending lengthwise of said pole portions on opposite sides thereof, terminals being provided on symmetrically opposite ends of said bus bars.

Another object of the invention is to provide for adjustment of the gap between the pole portions for accommodating different sizes of parts in closely fitting relation to the pole portions.

To this end and in accordance with another feature of the invention, one of said pole portions is provided with a screw and slot connection with the magnetic structure, said connection being arranged to provide for adjustment of said pole portion toward and away from the other pole portion when the screw of the connection is loosened.

These and other features and advantages of the invention as well as details of construction will now be further described in connection with the accompanying drawings in which, Fig. 1 represents a plan view of an embodiment of the present invention diagrammatically shown as associated with a vertically movable part and arranged for providing and measuring a voltage proportional to the velocity thereof;

Figure 2:
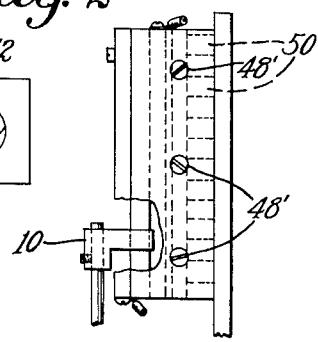
Fig. 2 is a side elevation of the embodiment shown in Fig. 1.
Figure 1:
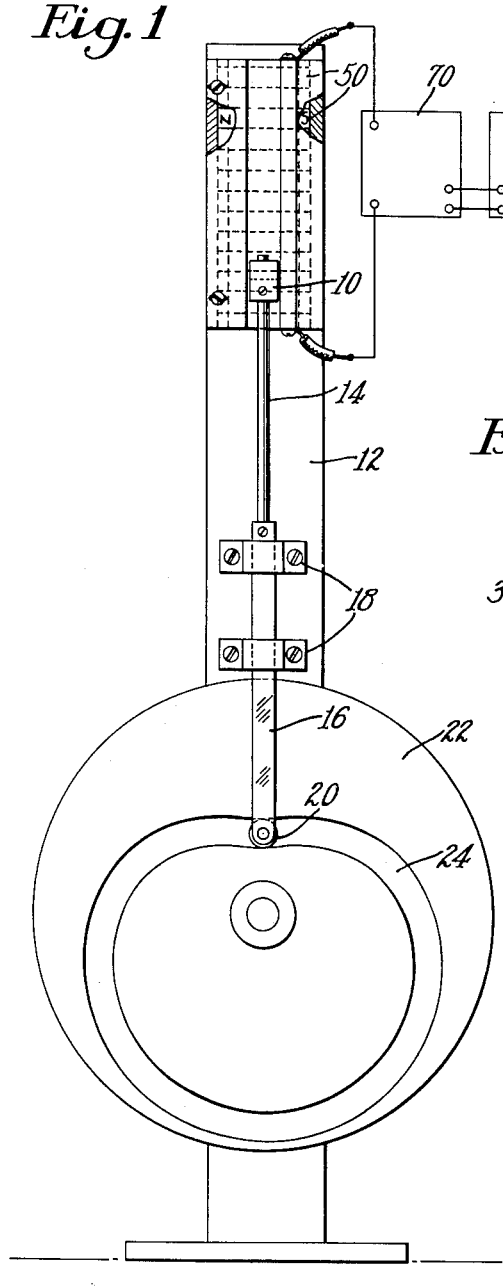

In Fig. 1 of the drawings, an illustrative embodiment of the present invention is shown in a demonstration set-up. An exemplary ferromagnetic part 10 is supported on a stand 12 for vertical movement by connection to a rod 14 and a slide member 16 supported in alined bearings 18 attached to the stand 12. At the lower end of the slide member 16 is a cam follower 20, while a cam 22 having a cam path 24 is rotatively supported by the stand so that rotation of the cam produces cyclic movement of the member 10.

Figure 3:
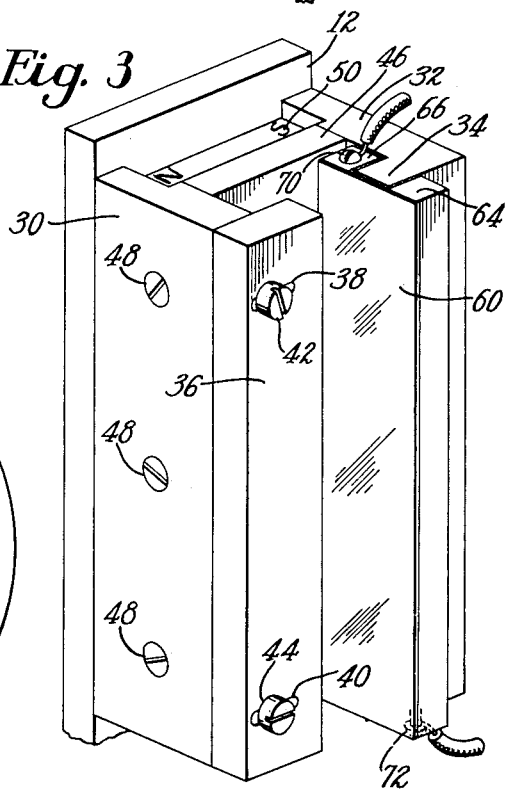
Fig. 3 is a greatly enlarged angular view of the embodiment of Fig. 1.

The velocity pickup is secured to the upper portion of the stand, and as best seen in Fig. 3, comprises two ferromagnetic side pieces 30 and 32 one of which, 32, has an inturned portion 34 forming a fixed pole portion. An adjustable pole portion 36 having transverse slots 38 and 40 is secured to the side piece 30 by screws 42 and 44. When the screws 42 and 44 are loosened, the pole portion 36 may be adjusted toward or away from the pole portion 34 to vary the width of the gap therebetween.

The side pieces 30 and 32 are respectively secured intermediate their edges to an elongated nonmagnetic spacer 46 by sets 48 and 48' of three screws. The spacer 46 may, for example, be constructed of aluminum. The edges of the side pieces 30 and 32 remote from the pole portions are rabbeted to receive a bank of permanent magnets 50. The bar magnets are arranged with their like poles adjacent so that, when they are clamped in place between the side pieces 30 and 32, an elongated ferromagnetic core structure having a generally U-shaped cross section is provided embodying magnetomotive force means for establishing a flux between the pole portions 34 and 36. While permanent magnets are usually most convenient for this purpose, an electromagnet can be used if desired.

An elongated conductor 60 of conductive sheet metal is disposed to extend lengthwise along and widthwise across the pole portion 34 in a plane transverse of and intersecting the flux across the gap along the inner surface of the portion 34. This conductor may be viewed as an infinite number of half turns extending across the gap and connected in parallel. When an electric current is generated in this conductor by the sweep of a flux concentration along the gap as produced by a ferromagnetic part moving therealong, it will be understood that an electric voltage is generated across that portion of the sheet 60 in the area of flux concentration. Because of the low impedance of the conductor, it is necessary to provide a very low impedance collection arrangement, and for this purpose heavy bus bars 64 and 66 are provided to extend along the edges of the sheet 60 on opposite sides of the flux gap, said bus bars having terminals 70 and 72 at symmetrically opposite ends to preserve linearity of the voltage to velocity output with changes of displacement.

In operation, the pickup is mounted so that the ferromagnetic part will move lengthwise of the gap between the pole portions 34 and 36, the latter being adjusted to the minimum gap which will accommodate the part. Connections may be made from the terminals of the pickup to a D. C. amplifier 70 and thence to an oscillograph 72, or the instantaneous output voltage from the pickup may be measured or recorded in any other desired fashion. To measure the velocity of the part, this voltage may be compared with the voltage produced by movement of the part at a known velocity.

Having thus described our invention, what we claim as new and desire to secure by Letters Patent of the United States is:

1. A velocity pickup comprising a ferromagnetic core structure providing elongated opposed pole portions providing an elongated gap between which at least a portion of the part to be studied may be moved, means embodied in said core structure for providing a magnetic flux between said pole portions along the said gap, a conductor disposed at least partly in the flux path across said gap along a substantial length thereof adjacent to one of said pole portions, and terminals connected to said conductor.

2. In a velocity pickup, a ferromagnetic core structure providing elongated opposed pole portions with a gap therebetween, said core structure including means for providing a magnetic flux between said pole portions along said gap, a sheet of conductive material extending along one of said pole pieces in a plane perpendicular to the flux in said gap, and a pair of collector bus bars extending lengthwise of said gap on opposite sides thereof, said sheet being connected to said bus bars at opposite edges thereof.

3. In a velocity pickup, a ferromagnetic core structure providing an elongated pole portion with a flat inner surface, a second pole portion adapted to be attached to said core structure in adjustably spaced relation to the aforesaid surface, means for providing a magnetic flux between said pole portions, and an elongated conductor extending lengthwise of said pole portions and intersecting the flux path therebetween.

4. In a velocity pickup, a ferromagnetic core structure providing elongated opposite pole portions defining an elongated gap, means for providing a magnetic flux in said gap, a pickup conductor comprising a flat rectangular sheet of conductive material supported adjacent to one of said pole portions and extending lengthwise along and widthwise transversely of said gap, bus bars extending along and connected to opposite edges of said sheet, and terminals at symmetrically opposite ends of said bus bars.

No references cited.